Figure 1:
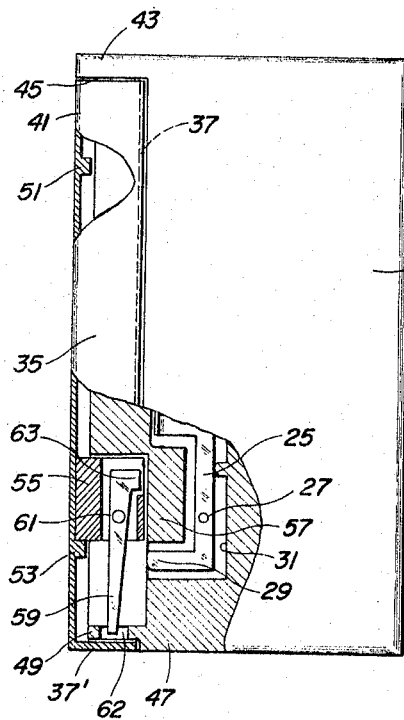

April 30, 1968 R. J. OLSON 3,380,366

CAMERA WITH A RETRACTABLE HAND GRIP

Filed Sept. 2, 1965

RICHARD J. OLSON
INVENTOR.

BY R. Frank Smith

ATTORNEYS

United States Patent Office 3,380,366
Patented Apr. 30, 1968

3,380,366
CAMERA WITH A RETRACTABLE HAND GRIP
Richard J. Olson, Pittsford, N.Y., assignor to Eastman Kodak Company, Rochester, N.Y., a corporation of New Jersey
Filed Sept. 2, 1965, Ser. No. 484,640
17 Claims. (Cl. 95—86)

This invention relates to photographic cameras and particularly motion picture camera apparatus.

The small type motion picture camera is normally built to be of minimum size commensurate with film size used. Also the small size makes for convenient and ready transportation, and reduces storage and shipping space with minimum size packaging. To this end, small size cameras often sacrifice some useful adjuncts, such as handle support structure which makes for easy and ready use, as well as affording more convenient operation.

By the present invention, a small size motion picture camera of the type here to be disclosed is provided with a sliding member which, in its retracted position, acts as a partial camera cover and closure element. But, in its open or extendable position, it also becomes a handle mechanism to support the unit. The usual motion picture camera includes a suitable form of view finder structure for sighting upon the scene or object to be photographed. In cooperative arrangement there is an objective lens structure to focus an image upon a film adapted to be unwound from a film storage magazine (usually in the form of a reel). After exposure the film is rewound into a storage magazine. In operation, the film is advanced by any desired type of film drive through a film gate where the exposure occurs. A suitable shutter mechanism is interposed between the film in the gate and the objective. This directs the image of the scene to be recorded upon film.

Both the film drive and the opening and closing of the shutter mechanism over the gate are controlled by a suitable battery-powered electrical drive functioning through suitable drive gearing or mechanical instrumentality wound by the user from time to time and then released during recording periods. Both these drives are controlled by operating a manually depressed trigger or switch.

In the case of the electrical drive, the trigger may close the electrical circuit to initiate the drive operation. For the mechanical drive, the trigger releases a drive-arresting component operating a spring mechanism for suitable film control.

The foregoing is an extremely generalized description given only to establish the type of structure here to be described to the field of its operation. It should be considered merely illustrative and not all inclusive. Various modifications may, of course, be utilized without departing from the spirit and scope of what is here disclosed.

The present invention may be regarded as providing a slidable member adapted to form a closure element for a portion of the camera. It may cover both the viewfinder and the objective lens systems when not in use and may form, in a second position, a handle support when the camera drive mechanism is to be used and pictures are to be exposed. The slidable component is carried upon the camera casing and encloses a suitable trigger block element in slidable position between the slidable element and the camera casing proper. The trigger block has a trigger-control mechanism pivoted on it. This trigger-control is made accessible to the operator who is able to release the structure for controlled time periods by depressing the trigger. This action releases and controls the film drive mechanism and the exposure controlling shutter.

At either end of the camera casing there is usually a suitable stop mechanism for holding and limiting the movement of the slidable covering element. The slidable element normally carries the operating means whereby the trigger block and the trigger thereby pivotally supported are moved to an inoperative position. When the slidable element is moved to an open camera position, the pivoted trigger held by the trigger block is arranged to slide through a recess at one end of the casing thereby to become accessible to the operator for controlling the periods of operation of the film drive mechanism.

Various methods of holding the slidable element in either of its extreme positions may be utilized. Among these units are suitable stops and embossings or, alternatively, a frictional fit. In the latter case, the fit between the slidable element and the camera casing is made quite tight to prevent an involuntary shift.

Figure 2:
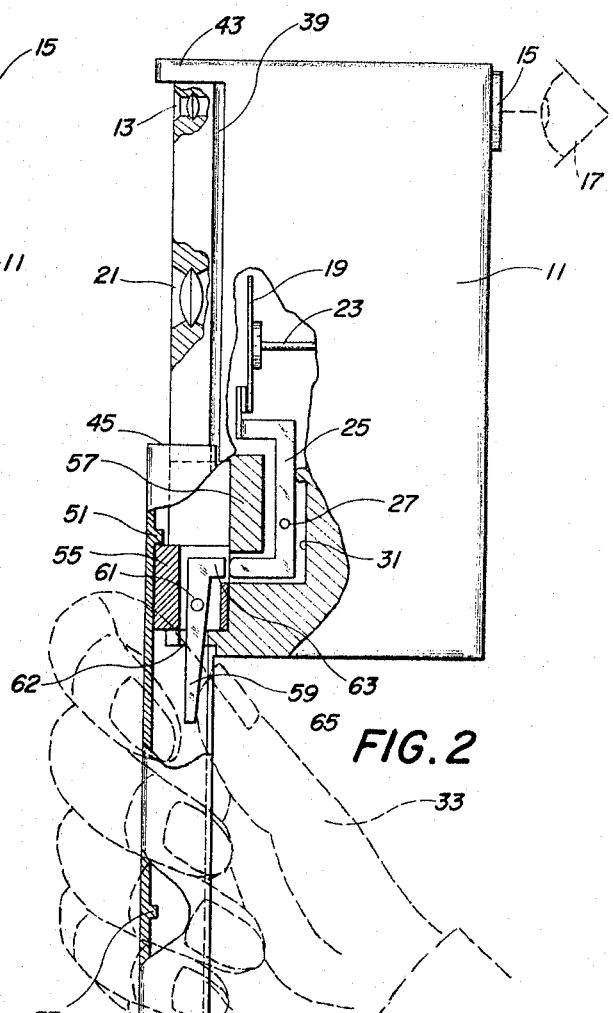

The principal objectives of this invention provide a simplified camera structure for small size cameras in particular by fitting these with a common element serving as both a casing closure component under one condition and as a casing-support component in a second condition. Other objects of the invention are to provide camera support structure which is light, easy to handle, convenient to manipulate and efficient in its use. Other aims and objects will be apparent from a reading of the following description in connection with the accompanying drawings, wherein:

FIG. 1 is an exemplification of the invention partly in elevation and partly in a sectional form when the camera closure element is in the casing closing position; and FIG. 2 is also a showing in elevation, partly in sectional form of the structure of FIG. 1 with the casing-closure element extended to a camera-support position.

Reference may now be made to the drawings for a further understanding of this invention. In the drawings, the casing element 11 is adapted to contain a view finder lens system 13 adapted to image an observed scene upon a view finding plane 15 through which an observer 17 (schematically represented) may view the field of action so that an image thereof may be focused upon a suitable film (not shown) contained within a film gate (not shown) behind a shutter mechanism 19. Focusing is achieved by a suitable lens element, conventionally represented at 21, which may be adjusted for directing the light of the scene sharply focused upon the suitable film positioned in the film gate behind the shutter mechanism 19, conventionally represented as rotating upon a shaft or spindle 23. The shutter machanism may be driven in any desired fashion (not shown) either mechanically or electrically under the control of a suitable pivoted drive-control elever element 25 movable about the pivot point 27 when suitably depressed from its L-shaped end 29. The camera control lever 25 is thus positioned within a spacing element 31 so as to be free to move therein when controlled by an operator conventionally represented by the hand 33.

Referring first to FIG. 1 of the disclosure, the slidable closure element 35 is a generally U-shaped element. The ends of the arms of this U-shaped element are turned inwardly, as indicated at 37, to slidably engage a groove 39 extending longitudinally of each side of the camera. The slidable closure element 35 may be of any shape but when formed of generally U-shaped configuration, the assembly of the component is readily achieved. In many instances, the upper end 41 of the slidable closure element may be recessed to permit exposure of the view finding objective 13. Alternatively, as shown more particularly by FIG. 1, the slidable element 35 may extend to a position where it completely covers the objective as well as the side of the camera mechanism.

The camera casing is preferably formed with an extended edge 43 against which the upper edge 45 of the slidable closure element 35 may abut in its position of closure. At the same time, slightly recessed from the lower edge 47 of the camera there is an outwardly extending rib 49 against which the overhanging edge 37' of the slidable closure member is adapted to abut when in the closed position. Within the slidable member 35 and located at regions generally close to its ends there is a pair of studs 51 and 53. These studs are formed to contact the trigger block 55 from opposite ends when the slidable closure element is moved. They provide a "lost motion" type of structure to shift the trigger block adjacent to a surface 57 intermediately mounted within the camera body itself. The trigger block 55 has a trigger 59 pivoted thereon at a pivot point 61. The trigger 59 is adapted to extend through the recess or opening 62 in the rib 49 for access in the extended position. The inner end 63 of the trigger in the extended position is located to contact outer end 29 of the film-drive control element 25, thereby to initiate, arrest and achieve maximum control of the film drive.

In the extended position of the slidable closure element 35 the outer end of the trigger 59 is exposed through a release recess 65 formed in the inner end. The extended position of the slidable component is particularly exemplified by FIG. 2 showing how the user has access to the trigger control so that by depressing or releasing the trigger under pressure of the thumb, the film drive operation can be initiated (released) or connected, as desired. The trigger element is preferably spring-biased by a spring mechanism (not shown) wrapped about the pivot spindle 61 tending to turn the trigger always in a counterclockwise direction about the pivot 61 and away from the end 29 of the control element for film drive control. Accordingly, pressure on the end of the trigger 59 operates against the force of the spring. If desired, the extendible handle provided by the slidable member may be retained in extended position by virtue of a detent or spring, generally in the form and type of an umbrella catch (not shown for convenience), which also may be depressed by the thumb of the user at times when it is desired to move the slidable element to cover the exposed portion of the casing.

While the invention has been disclosed specifically in combination with a motion picture camera, it is also usable in combination with a still camera. In fact, most of the modern types of motion picture apparatus are capable of selectively exposing film at a single frame at a time, as well as in a selected motion picture. So operated to expose individual film frames a motion picture camera is the equivalent of a still camera since each exposure is made by a separate actuation of the trigger member. Also, it is obvious that it might be desirable in still cameras to provide an extensible cover which would protect the lens and shutter trigger against accidental operation when the camera is being carried. It also provides a grip by which the camera may be steadied when pictures are being taken. The structure thus offers the possibility of eliminating the need of a camera-carrying case whose primary purpose is to protect the camera against damage or accidental actuation of the shutter.

Having now described the invention what is claimed is:

1. In a camera having a casing member containing an optical system and a shutter and control mechanism selectively movable from an inoperative position to an operative position to actuate said shutter, a slidable closure element structure, a slidable trigger-support block, a film-trigger element supported upon the block and adapted for selecting said operative and inoperative positions of the shutter control mechanism, said slidable closure element structure being movably secured to the casing for holding the trigger support block adjacent thereto, said slidable closure element being also adapted to be moved between two limiting positions, means supported on the slidable closure structure for moving the trigger-supporting block between a first limiting position wherein the supported trigger is inoperative to control the shutter-control mechanism and to a second limiting position wherein connection between the trigger and the shutter control mechanism is operative, said slidable closure element in its first limiting position forming a closure for one portion of the casing and in its second limiting position providing a support handle for the camera, the said handle having a recess therein for permitting manual contact of the trigger in the second limiting position.

2. The camera apparatus claimed in claim 1 wherein the casing member includes an extended edge adapted to form an abutment to limit sliding movement of the slidable means in one direction.

3. The camera apparatus claimed in claim 2 wherein the casing member also includes an outwardly extending rib at the other end of the path of movement of the slidable means to limit the movement of the trigger-support block when the slidable element is extended to a handle-forming position, and means to limit the trigger block movement with the slidable element in the casing-closing position to a portion only of the movement of the slidable element.

4. Camera support structure for providing in a first position a closure member for the casing within which a film shutter mechanism is included and in a second position a support therefor comprising a slidable closure element supported for closing one side of the casing and movable on the casing between two limiting positions, means for securing said element to the casing in slidable relationship so that in one limiting position one surface area of the casing is substantially covered thereby and in a second limiting position at least a part of the casing is exposed and the said element protrudes from the casing to form a support handle, a trigger block, means provided by the closure element to hold the trigger block in slidable relationship adjacent to the case, a shutter-triggering element pivotally supported on the block, means on the slidable closure element for moving the trigger block in one direction to render the triggering element inoperative when the slidable element is in one position to substantially close the casing and when, in a second position, to provide an operative connection between the pivoted trigger element and the film shutter mechanism when the slidable element provides a casing support handle, the said slidable closure element having a recess opening adjacent to the trigger with the slidable closure element in its open state to provide access to the trigger control area to move the trigger to control the camera shutter operation.

5. The structure claimed in claim 4 wherein the means for moving the trigger block comprise a lost-motion mechanism including a pair of stop elements positioned internally of the slidable closure element to contact opposite sides of the trigger block with closure element movement, thereby to carry the trigger to an operative position with movement of the slidable closure element to one position and to an inoperative position when in the second position, stop means in the casing to limit the block movement, one of said stop means having an opening through which the pivoted trigger is moved to bring it to a hand-actuating position.

6. A closure and support structure for use with a camera casing having therein a film magazine and shutter drive mechanism adapted to be triggered to expose individual frames of the film withdrawn from the magazine, said structure comprising a trigger support block, a trigger element pivotally carried on said block to actuate said shutter drive mechanism, a casing closure element slidably secured to the casing, means associated with the casing for limiting the sliding movement of the closure element relative thereto to a first limiting position for providing a casing covering and to a second limiting position for providing a casing support handle, and means connected with the casing closure element for moving the trigger support block between two limiting positions, one position rendering the trigger inoperative and the second position permitting trigger operation, the said closure element in its extended position having an opening therein to permit manual access to the trigger.

7. The closure structure claimed in claim 6 comprising, in addition, control means adapted to be in connecting location relative to the trigger in one position of its movement, the casing limiting means having a recess through which the trigger protrudes when the closure element is in its extended handle-forming position.

8. In a camera including a casing member containing an optical system, a shutter and a control member selectively movable from a normally inoperative position to an operative position to effect actuation of said shutter, the improvement comprising:
   handle means comprising a unitary structure movably mounted on said casing to move between a closed position, wherein it covers said optical system and renders said control member inaccessible for operation, and an open position, wherein it uncovers said optical system, provides a handle for supporting said camera while taking pictures, and renders said control member accessible for selective actuation of the shutter.

9. The invention according to claim 8 in which said last mentioned means include
   a manually operable trigger member for moving said control member to actuate said shutter, means for movably mounting the trigger member on said casing for movement between an operative position, wherein it is operatively associated with said control member, and an inoperative position, wherein it is disassociated from said control member,
   a cover member movably mounted on said casing to move between
      a first limiting position, wherein it covers said optical system, and
      a second limiting position, wherein it uncovers said optical system and provides a handle for supporting said camera while taking pictures, and
   means responsive to movement of said cover member to and from said first and second limiting positions for moving said trigger member to and from said inoperative and operative positions, respectively.

10. The invention according to claim 9, in which said casing member includes an overhanging lip forming an abutment for limiting movement of said cover member in one direction of its path of movement to position said cover member in said first limiting position.

11. The invention according to claim 9 in which said trigger member and the cover member are slidably mounted on said casing to move in substantially parallel paths of different lengths in moving between their operative and inoperative and first and second limiting positions, respectively, and
   in which said last mentioned means comprises a pair of projections on said cover member arranged to selectively engage said trigger member and slide it between said operative and inoperative positions when said cover member is slid between said second and first limiting positions, respectively, said pair of projections being spaced apart in the direction of movement of said cover member a distance greater than the length of the path of movement of said trigger member whereby said cover member in moving between its two positions travels farther than said trigger member in moving between its two positions.

12. The invention according to claim 9 in which said trigger member and cover member are slidably mounted on said casing to move along substantially parallel paths of different lengths in moving between their operative and inoperative and first and second limiting positions, respectively,
   in which said cover member confines said trigger member to slide within a recess in a wall of said casing,
   and in which said last mentioned means includes a lost-motion connection between said cover member and said trigger member whereby said cover member in moving between its two limiting positions moves a greater distance than said trigger member in moving between its operative and inoperative positions.

13. The invention according to claim 9 wherein said movable means in its extended position provides a camera support handle having a recess through which the trigger is accessible for manual movement thereof.

14. The invention claimed in claim 9 comprising, in addition, a trigger block for supporting said trigger, said means responsive to movement of the cover member also being adapted to move the trigger block, and an apertured stop means for limiting trigger block and trigger movement in one direction and for permitting manual accessibility to the trigger.

15. In a camera including a casing adapted to contain an optical system,
   the improvement comprising:
   a handle member movably mounted on the casing and having a first position wherein said member covers the optical system to protect the same and a second position wherein said member provides a handle for supporting the camera while taking pictures.

16. In a camera as claimed in claim 15 the improvement further including a manually operable camera operating element movably mounted on said handle member for operating the camera in said second position of said member.

17. In a camera as claimed in claim 16, wherein said movable operating element is inaccessible for manual operation in said first position of said handle member.

References Cited
UNITED STATES PATENTS 2,535,152  12/1950  Nelson.
3,240,143  3/1966  Koeber _____ 95—86

JOHN M. HORAN, *Primary Examiner.*